(12) United States Patent
Yamamoto

(10) Patent No.: US 6,833,952 B2
(45) Date of Patent: Dec. 21, 2004

(54) STEREOSCOPIC DISPLAY APPARATUS, ENDSCOPE AND MICROSCOPE BOTH USING THE APPARATUS

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 0 days.

(21) Appl. No.: 09/906,747

(22) Filed: Jul. 17, 2001

(65) Prior Publication Data

US 2002/0008908 A1 Jan. 24, 2002

(30) Foreign Application Priority Data

Jul. 18, 2000 (JP) ........................................ 2000-218009

(51) Int. Cl.⁷ .................... G02B 27/26; G03B 21/00; H04N 13/04
(52) U.S. Cl. .................... 359/465; 359/462; 359/630; 348/57; 348/58; 353/7; 353/8; 353/9; 345/7
(58) Field of Search ................ 359/465, 630, 359/618, 634, 636, 638, 462, 464, 480; 345/7, 8, 9; 353/7, 8, 9; 348/57, 58, 5, 53

(56) References Cited

U.S. PATENT DOCUMENTS 2,832,821 A * 4/1958 Du Mont .................... 359/465
2,845,618 A * 7/1958 Huffman ..................... 359/465
5,198,928 A * 3/1993 Chauvin ..................... 359/465
5,568,314 A * 10/1996 Omori et al. ................ 359/464
5,956,180 A * 9/1999 Bass et al. ................... 359/479

FOREIGN PATENT DOCUMENTS

JP 62-68119 4/1987
JP 09-138367 5/1997

OTHER PUBLICATIONS

English Language Abstract of JP62–68119.
English Language Abstract of JP 09–138367.

* cited by examiner

Primary Examiner—Audrey Chang
(74) Attorney, Agent, or Firm—Michael D. Bednarek; Shaw Pittman LLP

(57) ABSTRACT

A stereoscopic display apparatus 20 is employed in combination with an image transmission section 10. A case 1 includes a half-mirror 3, a visual field lens 4 and polarizers 22L, 22R therein, and an observation port 23 with a hood is defined in the case 1. A band 25 to be worn on a viewer's head is disposed in the exterior of the case 1. Both of the polarizers 22L and 22R are so designed as to display the stereoscopic images for the right and left eyes on the basis of data transmitted from the image transmission section 10, respectively, and the image lights are guided to the viewer's eyes through the half-mirror 3 and the visual field lens 4. The stereoscopic display apparatus 20 is of the head mount type that guides the images for the right and left eyes projected onto one display screen which is formed of the half-mirror 3 to the right and left eyes.

7 Claims, 6 Drawing Sheets

STEREOSCOPIC DISPLAY APPARATUS, ENDSCOPE AND MICROSCOPE BOTH USING THE APPARATUS

BACKGROUND OF THE INVENTION

1. Field of the Invention

The present invention relates to a stereoscopic display apparatus and a technique to which the stereoscopic display apparatus is applied.

2. Description of the Related Art

There has been well known such a fact that a stereoscopic image obtained by a stereoscopic vision is incomparably excellent in realistic sensations and reality as compared with a normal planar image. Up to now, in order to employ the usefulness of the stereoscopic image, an attempt has been made that the application of the stereoscopic image to medical equipments, video game machines or the like becomes widespread.

In the case of applying the stereoscopic vision to the medical equipments or the video game machines, a facility has been demanded for a stereoscopic display apparatus used for giving the stereoscopic image to a viewer. Also, it is preferable that the stereoscopic display apparatus employed for the above intended purpose is of the head mount type that readily ensures the degree of freedom of viewer's hands because the viewer is required to handle an operation appliance or manipulate a game controller.

Incidentally, the stereoscopic vision is realized by the celebration of brains using such a phenomenon that a parallax occurs in images picked up by the respective right and left eyes of the viewer. In order to realize the stereoscopic vision, there is required that image lights from the images for the respective right and left eyes with a constant parallax are supplied to the respective right and left eyes, and various display apparatuses that comply with such a requirement have been proposed.

As techniques for supplying the above image light, there have been known one technique in which the images for the respective right and left eyes are displayed on one display screen in a superimposing manner, and the image lights from the images are separated from each other by some means and given to the respective right and left eyes, and another technique in which the images for the respective right and left eyes are projected onto two display screens, respectively, and the images for the respective right and left eyes are viewed by the respectively right and left eyes, separately.

The stereoscopic display apparatus using one display screen is designed in such a manner that the images for the respective right and left eyes are projected onto one screen, the image lights from the respective images are separated and guided to the respective right and left eyes, to thereby realize the stereoscopic image. The stereoscopic display apparatus of this type is advantageous in that everybody can readily realize the stereoscopic vision because such a work that those two images are assembled into one stereoscopic image by their selves which will be described later is not required.

However, this technique makes it difficult to realize the facility and the downsizing because there is required a means for separating the image lights from the images for the respective right and left eyes which are displayed on the display screen in the superimposing fashion.

In other words, as a measure for separating the image lights which is required for the above-mentioned necessity, polarization is generally employed. The separation of polarization is implemented by, for example, a technique in which the images for the respective right and left eyes which project polarized lights different in property as image light are displayed on one screen, for example, in a time division manner, and the viewer has glasses worn.

This technique suffers from a minor problem from the viewpoint of the facility because the viewer is compelled to put on polarized glasses. Also, the stereoscopic display apparatus of that type is unavoidably liable to be complicated and large-sized because the means for separating the polarized lights is necessary.

Taking the above circumstances into consideration, the research and development of the stereoscopic display apparatuses of the head mount type which can be simply dealt with are being promoted with the application of the above-mentioned technique using two images.

The technique using two display screens is to transmit the image lights which are supplied to the respective eyes from those two display screens, separately. Therefore, since no structure for separating the lights is required, and the structure of the apparatus can be simplified, the apparatus can be readily downsized, and that technique is readily applied to the stereoscopic display apparatus of the head mount type or the like.

However, in the case of using those two display screens, the viewer is required to assemble two images naturally produced into one image by himself while viewing those two images. That is, in the technique using two display screens, the viewer does not conduct the stereoscopic vision so far as the positional relationship between those two display screens and the positional relationship between two eyes of the viewer do not satisfy very severe conditions. Therefore, this technique makes it fundamentally difficult that the viewer is allowed to conduct the stereoscopic vision.

What plays an important role in order to obtain one stereoscopic image from two images is a technique that is called "an inter-eye width adjustment". Therefore, a mechanism for adjusting the width of the image lights to the width of both the right and left eyes is required for the stereoscopic display apparatus based on the above technique. This mechanism is complicated, resulting in many cases in which the apparatus becomes large-sized. Also, the above-mentioned inter-eye width adjustment does not satisfy a requirement such as the facility demanded for the video game machine because the inter-eye width adjustment cannot be executed not through miscellaneous processes such as the measurement of the inter-eye width.

Most importantly, this technique makes it difficult to conduct the stereoscopic vision, and even if the stereoscopic vision is conducted, the fatigue of the viewer is liable to become large.

The present inventors have promoted the research of the stereoscopic vision and come to the conclusion that a stereoscopic display apparatus which will be widespread as a facile and accessible apparatus.

SUMMARY OF THE INVENTION

Therefore, the present invention has been made as a result that the present inventors have promoted the research of the stereoscopic vision, and therefore an object of the present invention is to provide a stereoscopic display apparatus which is small in size and does not require the adjustment of an inter-eye width.

Another object of the present invention is to provide an endscope and a microscope to which the above stereoscopic display apparatus is applied.

In order to achieve the above objects, according to the present invention, there is provided a stereoscopic display apparatus, comprising:

two liquid crystal devices for picking up image lights for respective right and left eyes of a viewer from an image source;

a half-mirror onto which images of the respective right and left eyes having a parallax from said two liquid crystal devices for a stereoscopic vision as a stereoscopic image are projected; and two polarizers for the respective right and left eyes disposed between said half mirror and the respective right and left eyes of the viewer;

wherein said half-mirror operates to transmit the image lights from one of said two liquid crystal devices and to reflect the image lights from the other one of the said two liquid crystal device so that the transmitted image lights and reflected image lights are orthogonally polarized with respect to each other, and the transmitted image lights and the reflected image lights are combined and guided to said two polarizers by said half-mirror;

wherein said two polarizers for the respective right and left eyes receive the combined image lights and separate the combined image lights for the respective right and left eyes, in which one of the said polarizers shuts out the transmitted image lights in the combined image lights and allows the reflected image lights to pass through said one polarizer, and the other polarizer shuts out the reflected image lights in the combined image lights and allows the transmitted image lights to pass through said the other polarizer, and the separated image lights are given to the respective right and left eyes of the viewer to conduct the stereoscopic vision; and wherein said liquid crystal devices, said half-mirror and said polarizers are fitted to one casing.

Since the stereoscopic display apparatus is of a type using one display screen, everybody can conduct the stereoscoptic vision and does not suffer from an excessive fatigue even in use for a long period of time. Also, since the stereoscopic display apparatus has the polarizers at a display screen side, a trouble such that the viewer puts on polarized glasses is not required.

The polarization from the half-mirror is not limited. For example, the respective polarizations for the right and left eyes may be polarized lights different in rotating direction. Also, the polarizations may be linear polarized lights having vibration planes which are orthogonal to each other. In this case, the half-mirror is designed in such a manner that the image lights of the images for the respective right and left eyes are converted into polarized lights having the vibration planes orthogonal to each.

The above-mentioned display screen may be structured as follows although it is not limited to the following structure.

That is, there are provided a half-mirror and two display devices, that control pixels for image display by using the polarization and have the vibration directions of the polarized lights angled at 45° with respect to the half-mirror. Also, the vibration planes of the two display devices are orthogonal to each other, and one of the vibration planes becomes a transmitted light and the other vibration plane becomes a reflected light so that the images for the respective right and left eyes displayed on said display devices, respectively, are guided to said half-mirror, thereby being capable of displaying the images for the respective right and left eyes on the half mirror.

This structure is devised from the following viewpoints.

That is, in the display device such as a liquid crystal display device that controls the pixels for the image display by using the polarized lights, the image lights from the apparatus becomes naturally polarized lights. Therefore, there is the possibility that the polarized lights for the images for the respective right and left eyes in a polarized glasses system are obtained by utilizing the image lights that become naturally the polarized lights. If the polarized lights inherent to the display apparatus can be utilized, the polarizers for polarizing the image lights in the conventional polarized glasses system can be made unnecessary, and problems caused by light reduction due to the polarizers, that is, such problems that the image becomes dark, or the apparatus becomes large-sized in order to require a more intense light source can be effectively eliminated.

From the above viewpoints, the present inventors have promoted the research. As a result, the polarized light that has passed through the half-mirror does not change its vibration plane, but the polarized light reflected by the half-mirror may change its vibration direction although depending on an aspect of the vibration direction. For that reason, the present inventors have proved that the polarized lights for the images for the respective right and left eyes can be obtained even without using any polarizer. In particular, in case of the liquid crystal display apparatus, control is made in such a manner that the vibration direction of the output polarized lights is generally angled at 45° with respect to the liquid crystal screen, and because the polarized lights that have been reflected by the half-mirror and symmetrically inverted have their vibration directions rotated by 90°, the polarized lights for the images for the respective right and left eyes are very conveniently obtained.

Accordingly, if the display apparatus such as a liquid crystal display apparatus is used in which the pixels for the image display are controlled by using the polarized lights, and the vibration directions of the polarized lights are angled at 45° with respect to the half-mirror, one optical system for obtaining the image light for the right eye and another optical system for obtaining the image light for the left eye can be so structured as to be completely identical with each other, and therefore the structure for obtaining the display apparatus can be simplified. Also, if the display apparatus that naturally outputs the polarized light as described above is used, the polarizers required up to now for obtaining the polarized light becomes useless, and the apparatus is downsized.

The above angle of 45° requires that one vibration plane of the polarized light reflected by the half-mirror is substantially orthogonal to the other vibration plane of the polarized light but does not require 45 accurately.

The polarizers in the stereoscopic display apparatus according to the present invention may be movable or fixed if the polarizers are fitted to the casing. If the polarizers are fixed, the stereoscopic vision can be readily conducted by viewing only the polarizers with the fixation of the-relative positions of the polarizers for the respective eyes to image optical paths in the stereoscopic display apparatus.

Also, the casing of the stereoscopic display apparatus according to the present invention may be freely shaped and structured without specific limits. The half-mirror and the polarizers for the respective right and left eyes may be exposed from the casing or may be accommodated in the interior of a hollow casing.

Further, the casing has an observation port with a hood, and the viewer can conduct the stereoscopic vision while keeping distances between the polarizers within the casing and the respective eyes of the viewer constant by pressing the periphery of the eyes against the hood by the viewer. With this operation, the viewer can more readily obtain the stereoscopic effect. That is, if the polarizers and the eyes of the viewer are apart from each other longer than a predetermined distance, the polarizers enter the visual field of the viewer, thereby making it difficult to conduct the stereoscopic vision. Therefore, the viewer makes observation while pressing the periphery of the eyes against the hood so as to keep the distances between the respective eyes of the viewer and the polarizers to the degree where the other polarizer for the eye does not enter the visual field, to thereby readily conduct the stereoscopic vision.

The casing of the stereoscopic display apparatus may be fixedly attached to a fixed substance. In the case where importance is attached to ensuring the ease of motion of a viewer's head, it is preferable that the casing is so movable as to follow the motion of the viewer's head. For example, the casing can be hung from a ceiling or the casing can be mounted on a movable self-sustaining stand. Also, with the provision of a wearing means for wearing the casing on the viewer's head, the casing can be fixed to the viewer's head in a state where the respective right and left eyes of the viewer face the observation port. With the above structure, the stereoscopic display apparatus can be used in such a state that a goggle is used, resulting in a head mount type apparatus having a small limit of the position of the viewer.

It is preferable that the stereoscopic display apparatus is equipped with a lens or a mirror which convert the images produced by the respective image lights that have passed through the polarizers for the respective right and left eyes into virtual images. The provision of the lens and the mirror makes it easier to conduct the stereoscopic vision and also makes it possible to further reduce the fatigue of the viewer.

The above-mentioned lens and mirror may be formed of one lens for both of the right and left eyes or one mirror for both of the right and left eyes. With this structure, the accuracy in the inter-eye width adjustment is not required. In other word, with the above structure, if the right and left eyes are positioned in a range where the respective image lights that have passed through the polarizers for the respective right and left eyes are guided, the stereoscopic vision is conducted even if the accurate adjustment of the inter-eye width is not conducted.

Also, the above-mentioned lens and mirror may be formed of different lenses and mirrors for the respective right and left eyes. In this case, the stereoscopic vision is not conducted if the inter-eye width adjustment is not conducted such that the pupils of the respective right and left eyes coincide with the respective centers of the lenses and the mirrors for the respective right and left eyes (the centers of the optical paths) with a predetermined precision. However, with the above operation, the lenses and the mirrors can be downsized and weight-saved.

The mirrors and the lenses equipped in the stereoscopic display apparatus may be disposed at the display screen side rather than the polarizers for the respective right and left eyes. In this case, the polarizers for the respective right and left eyes may be so arranged as to be positioned immediately before the respective eyes of the viewer. In this case, the polarizers for the respective right and left eyes may be set to be larger than the size of the respective right and left eyes.

Also, the above-mentioned display screen may be freely designed without any limit. For example, in the case of applying a time-division system, there may be used such a display apparatus that the images for the respective right and left images are alternately continuously displayed.

The half-mirror may be displayable so that the common images contained in the images for the respective right and left eyes which are displayed on the half-mirror coincide with each other.

This is based on the following knowledge that has been obtained through the research by the present inventors.

That is, according to the research of the present inventors, one cause of the viewer's fatigue is that the common images commonly contained in the images for the respective right and left eyes which are projected onto one display screen in a superimposing manner are displaced from each other on the screen (doubly displayed). On the other hand, in case of the images for the respective right and left images which have been imaged by giving a predetermined convergent angle, even if the relative position of two images is slightly changed, the viewer can obtain the stereoscopic effect.

As a result, it is concluded that when the common images contained in the images for the respective right and left eyes are projected onto the half-mirror, if the positions of the common image on the display screen are made to coincide with each other, the stereoscopic vision is enabled, and the viewer does not suffer from the fatigue. That is, the present inventors have the knowledge that if the images for the respective right and left eyes are display in such a manner that the common image contained in the images for the respective right and left eyes coincide with each other on the half-mirror, the viewer's fatigue can be suppressed.

It is unnecessary that the common images are made to always coincide with each other, but it is preferable that the processing is applied depending on the contents of the images for the respective right and left eyes. Also, it is possible that change-over such that the common images are made to coincide with each other or not may be conducted appropriately.

Also, the display apparatus according to the present invention is suited for the application to medical equipments such as an endscope or a microscope. According to the medical equipments of this type, in the case of conducting an operation using the endscope or an operation using a microscope, the operation can be conducted on the basis of a video with the stereoscopic effect, thereby being capable of enhancing the safety of the operation.

According to the present invention, there is provided an endscope comprising a video camera that picks up images for the respective right and left eyes with a parallax for a stereoscopic vision; and a stereoscopic display apparatus that reproduces the images for the respective right and left eyes which are supplied from the video camera to conduct a stereoscopic vision; wherein the stereoscopic display apparatus mentioned above is used as the stereoscopic display apparatus.

Also, according to the present invention, there is provided a microscope, comprising: a video camera that picks up images for the respective right and left eyes with a parallax for a stereoscopic vision; and a stereoscopic display apparatus that reproduces the images for the respective right and left eyes which are supplied from the video camera to conduct a stereoscopic vision; wherein said stereoscopic display apparatus according to the present invention is used as the stereoscopic display apparatus.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Figure 1:
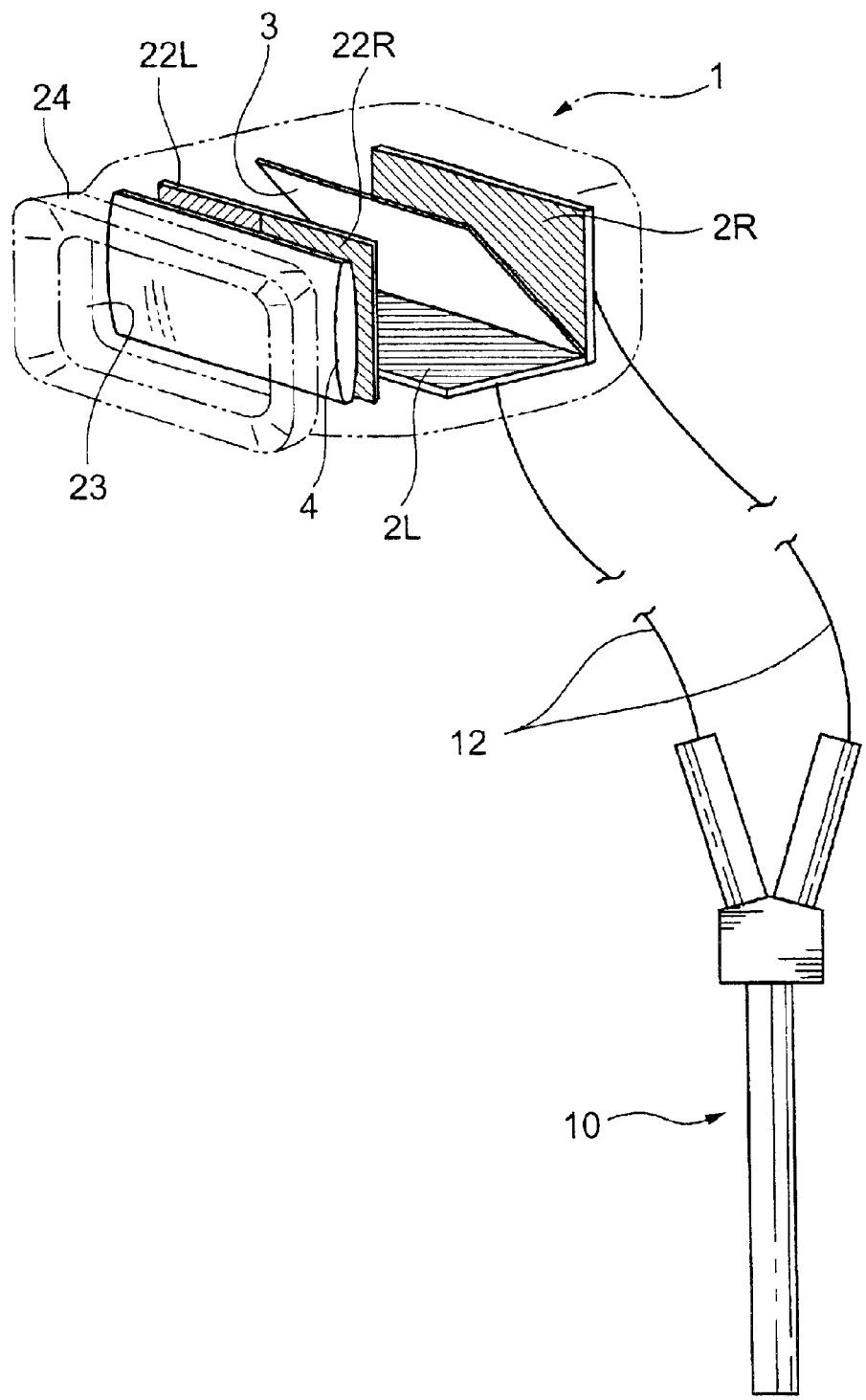
FIG. 1 is a perspective view showing the structure of an endscope in accordance with an embodiment of the present invention.
Figure 2:
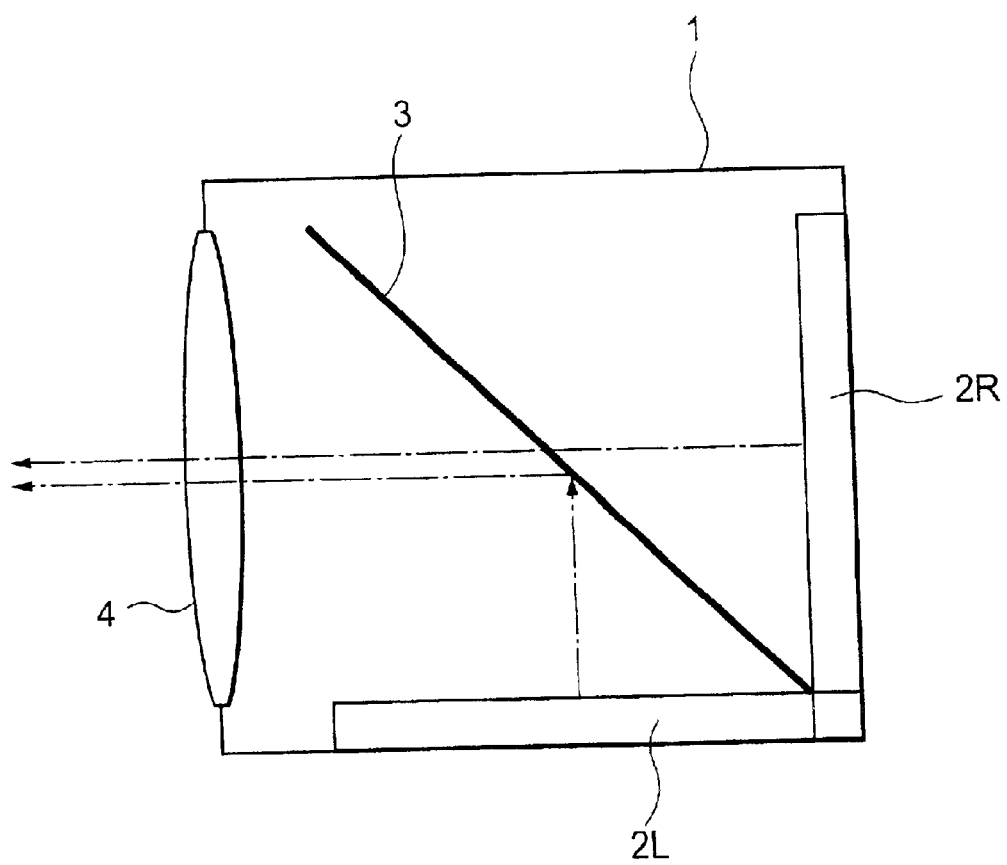
FIG. 2 is a cross-sectional view showing the inner structure of a stereoscopic display apparatus in FIG. 1.
Figure 3:
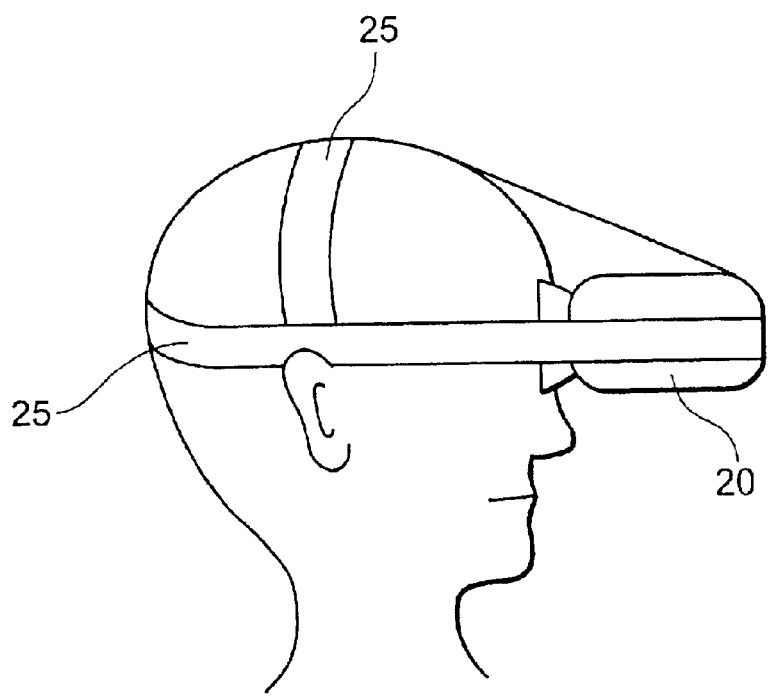
FIG. 3 is a schematic view showing a state in which the endscope shown in FIG. 1 is used.

The structure of a stereoscopic display apparatus according to one embodiment of the present invention is schematically shown in FIGS. 1 to 3.

As shown in FIGS. 1 and 2, an endscope according to the present invention is formed of an image transmission section 10 and a stereoscopic display apparatus 20.

The image transmission section 10 is so designed as to be inserted into a human body from a dissected portion of the body, for example, as in a borescope. The image light injection side of the image transmission section 10 is fitted with a video camera not shown. A signal representative of an image is transmitted from the video camera to liquid crystal display devices 2L and 2R through a cable 12. The number of video camera in this embodiment is two although the present invention is not always limited to this, and those video cameras are fitted into the image transmission section 10 in a state where the optical axes of those video cameras are relatively inclined by several to several tens degrees.

The stereoscopic display apparatus 20 has a case 1 as a housing. An observation port 23 is disposed in front of the case 1, and a hood 24 is disposed in the periphery of the observation port 23. Also, a band 25 is disposed in the outer periphery of the case 1 as a fixing means (refer to FIG. 3).

The pair of liquid crystal display devices 2L and 2R and a half-mirror 3 that functions as one image display screen are disposed in the interior of the case 1. Polarizers 22L and 22R for both of eyes are disposed between the half-mirror 3 and a visual field lens 4. The outputs from the above-mentioned video cameras are inputted to the liquid crystal display devices 2R and 2L as an image for the right eye and an image for the left eye, respectively. Also, the visual field lens 4 is disposed in front of the case 1. In this embodiment, the visual field lens 4 is commonly used for both of the right and left eyes. The visual field lens 4 is of the type that makes the image from the half-mirror 3 into a virtual image. The provision of the visual field lens 4 enables a more visible image to be obtained.

Figure 5:
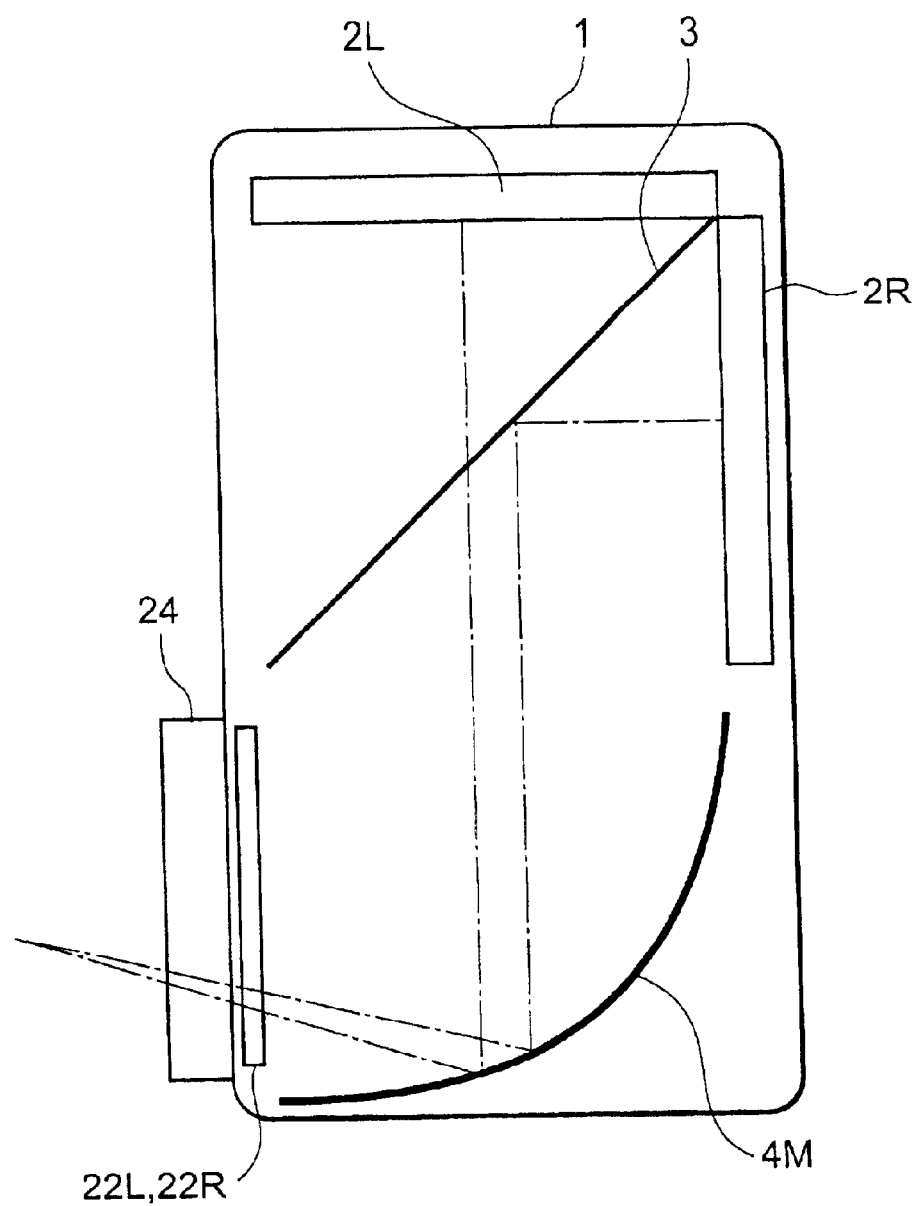
FIG. 5 is a perspective view showing a modified example of the stereoscopic display apparatus shown in FIG. 1.

The visual field lens 4 may be replaced by a mirror 4M having the same function as that of the visual field lens 4. For example, the structure shown in FIG. 5 is applicable.

An image for each of the right and left eyes is displayed on each of the liquid crystal display devices 2L and 2R as a stereoscopic image. The image lights emitted from those images are given to the viewer by the half-mirror 3.

That is, the image light from the liquid crystal display device 2R that displays the image for the right eye penetrates the half mirror, and the image light from the liquid crystal display device 2L that displays the image for the left eye is reflected by the half mirror so that the respective image lights are guided to the right and left eyes. As a result, the polarization of the image light from the liquid crystal display device 2R maintains the vibration plane in a direction inherent to the liquid crystal display device 2L while the polarization of the image light from the liquid crystal display device 2L has the vibration plane rotated by 90° from the vibration plane in the direction inherent to the liquid crystal display device 2R by reflection from the half-mirror 3. That is, the image for the left eye and the image for the right eye are orthogonal in the vibration plane of the polarization to each other (Refer to FIG. 2).

The hatched lines shown in the liquid crystal display devices 2L and 2R of FIG. 1 illustrate the direction of the plane of polarization of the polarized light output from the liquid crystal display devices 2L and 2R. The hatched lines shown in the polarizers 22L and 22R of FIG. 1 illustrate the direction of the plane of polarization of the polarized light passing through the polarizers 22L and 22R.

Figure 4:
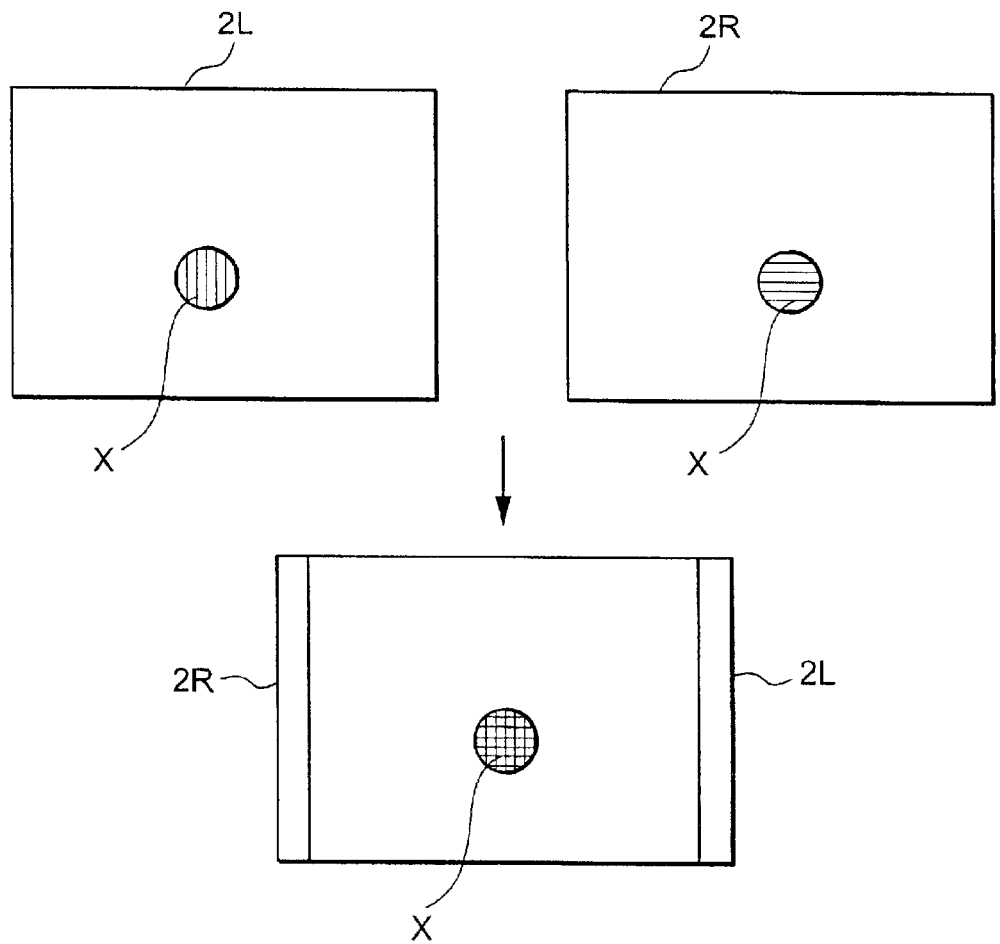
FIG. 4 is a diagram for explaining a method of adjusting the positions of images for the respective right and left eyes.

In the stereoscopic display apparatus according to this embodiment, the common images X in the images for the respective right and left eyes which are projected on the half-mirror 3 that is one display screen are superimposed on each other, and the images are displayed on the liquid crystal display devices 2L and 2R, respectively although such a structure is not always required (refer to FIG. 4). A specific mechanism for enabling the positioning of the common images is not particularly limited, but in this embodiment, the positioning of the common images are conducted in a software fashion by shifting both of the images on the screen by a control means not shown right and left. The positional adjustment of the images for the respective right and left eyes can be conducted, for example, in such a manner that a mechanical moving means such as a pinion/rack mechanism is fitted to at least one of the liquid crystal display devices 2L and 2R, and at least one of the liquid crystal display devices 2L and 2R are physically moved right and left.

Also, the positional adjustment of the images for the respective right and left eyes may be conducted as occasion demands.

The viewer using the above endscope inserts the image transmission section 11 into the body of a person who should be subjected to an operation, and fixes the stereoscopic display apparatus 20 onto his head by the band 25 while pressing the outer periphery of the eyes against the hood 24 disposed in the periphery of the observation port 23 as shown in FIG. 3.

Figure 6:
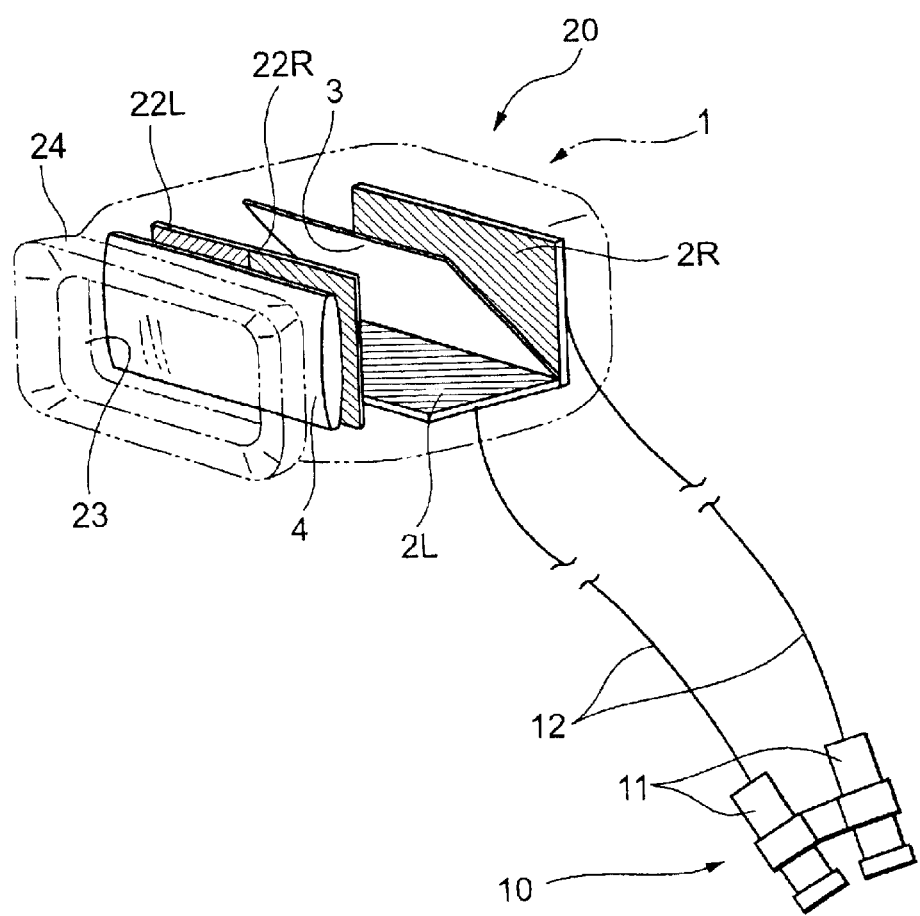
FIG. 6 is a schematic view showing a state in which a microscope is used in accordance with another embodiment of the present invention.

Subsequently, the structure of a microscope according to one embodiment of the present invention will be described with reference to FIG. 6. In this embodiment, the microscope is equipped with the image transmission section 10 and the liquid crystal devices 2L and 2R that reproduces a signal from the image transmission section 10 for conducting a stereoscopic vision. The image transmission section 10 has, for example, a pair of imaging means such as CCD cameras 11, and a pair of cables 12 connected to the CCD camera 11 display implements 20. Each of the CCD cameras 11 is fitted with a lens system not shown for imaging and image-enlargement on the CCD, and gives a predetermined convergent angle between the CCD cameras.

The structure of the stereoscopic display apparatus 20 is identical with that in the above endscope, and the pair of cables 12 are connected to the liquid crystal display devices 2L and 2R within the display implement 20p, to thereby reproduce the images for both of the right and left eyes.

As was described above, according to the present invention, there can be provided the stereoscopic display apparatus which enables everybody to conduct the stereoscopic vision, does not suffer from an excessive fatigue even in use for a long period of time, and is small in size. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A head-mount type stereoscopic display apparatus, comprising:

two liquid crystal devices for displaying image lights for respective right and left eyes of a viewer from an image source;

a half-mirror onto which images of the respective right and left eyes having a parallax from said two liquid crystal devices for a stereoscopic vision as a stereoscopic image are projected; and two polarizers for the respective right and left eyes disposed between said half mirror and the respective right and left eyes of the viewer;

wherein said half-mirror operates to transmit the image lights from one of said two liquid crystal devices and to reflect the image lights from the other one of the said two liquid crystal device so that the transmitted image lights and reflected image lights are orthogonally polarized with respect to each other, and the transmitted image lights and the reflected image lights are combined and guided to said two polarizers by said half-mirror;

wherein said two polarizers for the respective right and left eyes receive the combined image lights and separate the combined image lights for the respective right and left eyes, in which one of the said polarizers shuts out the transmitted image lights in the combined image lights and allows the reflected image lights to pass through said one polarizer, and the other polarizer shuts out the reflected image lights in the combined image and allows the transmitted image lights to pass through said the other polarizer, and the separated image lights are given to the respective right and left eyes of the viewer to conduct the stereoscopic vision;

wherein the image lights displayed by said two liquid crystal devices are polarized light, and wherein said liquid crystal display devices control pixels for image display by using polarization and are arranged to have polarization planes of the polarized lights angled at 45° with respect to the half-mirror, and polarization planes of said two liquid crystal display devices are the same as each other, wherein one of the polarization planes becomes the transmitted light and the other polarization plane becomes the reflected light so that the image lights for the respective right and left eyes displayed on said liquid crystal, respectively, are guided to said half-mirror, thereby displaying the images for the respective right and left eyes on the half mirror; and wherein said liquid crystal devices, said half-mirror and said polarizers are fitted to one casing.

2. The head-mount type stereoscopic display apparatus as claimed in claim 1, wherein the polarizers for the respective right and left eyes are fixedly disposed in image optical paths.

3. The head-mount type stereoscopic display apparatus as claimed in claim 1, wherein said casing has an observation port with a hood, and the viewer can conduct the stereoscopic vision while keeping distances between said polarizers within said casing and the respective eyes of the viewer constant by pressing the periphery of the eyes against said hood by the viewer.

4. The head-mount type stereoscopic display apparatus as claimed in claim 1, wherein said case includes wearing means for wearing the casing on the viewer's head.

5. The head-mount type stereoscopic display apparatus as claimed in claim 1, further comprising one of a lens and a mirror which convert the images produced by the respective image lights that have been passed through said polarizers for the respective right and left eyes into virtual images.

6. The head-mount type stereoscopic display apparatus as claimed in claim 1, further comprising a single lens and a single mirror for both of the right and the left eyes.

7. The head-mount type stereoscopic display apparatus as claimed in claim 1, wherein said half-mirror is arranged so that the common images contained in the images for the respective right and left eyes which are displayed on said half-mirror coincide with each other.

* * * * *